H. OGBORN.
Bee Hive.

No. 42,017. Patented March 22, 1864.

Witnesses
G. W. Stigliman
John W. Free

Inventor
Harrison Ogborn

UNITED STATES PATENT OFFICE.

HARRIS OGBORN, OF RICHMOND, INDIANA.

IMPROVEMENT IN BEE-HIVES.

Specification forming part of Letters Patent No. 42,017, dated March 22, 1864.

*To all whom it may concern:*

Be it known that I, HARRISON OGBORN, of Richmond, in the county of Wayne and State of Indiana, have invented a new and useful Improvement in Bee-Hives; and I do hereby declare the following to be a full, clear, and exact description of the construction and operation of the same, reference being had to the annexed drawings, making a part of this specification, in which—

Figure 1:
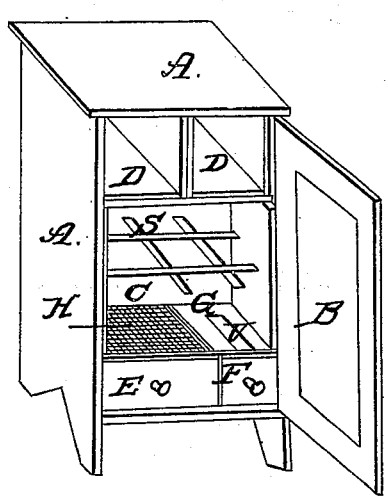
Figure 2:
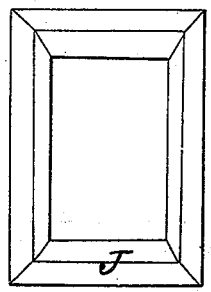
Figure 3:
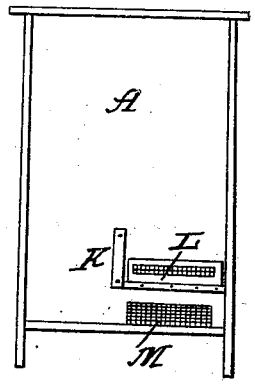
Figure 6:
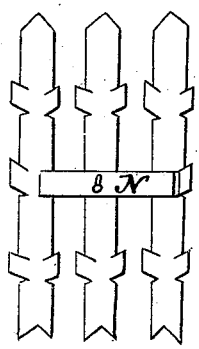
Figure 5:
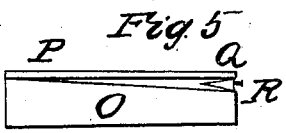
Figure 4:
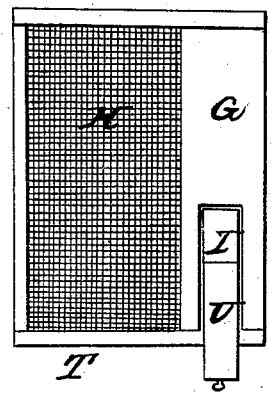

Figure 1 is a perspective view of the back part of the hive, with door thrown open to show the internal arrangement of the same. Fig. 2 is a top view of the piece of metal that fits on top of the moth-trap. Fig. 3 is a plan view of the front of the hive. Fig. 4 is a vertical view of the board that fits over the feeder and of the scren that fits between the brood-box and the moth-trap. Fig. 5 is a plan view of one of the pieces on which the brood-box rests, and showing the groove wedge and edge of screen H. Fig. 6 is a vertical view of convex strips that fit in the bottom of the moth-drawer.

I construct my bee-hive as follows, with five drawers, as shown at Fig. 1, letter A being the outside or body of the hive boxes, D D being the honey-drawers, or receptacle for extra honey, made of any desirable size, with glass ends, so they may be looked into to see when they are full enough to draw out. They are provided with passages for the bees.

C is the brood-box, made of convenient size, the back end of which is glass. It is provided with sticks suitable for holding up the combs; also, with suitable passages up into the honey-boxes. It is also provided with an opening, as shown at L in Fig. 3, for the bees to pass in and out. It has a movable bottom, part plank and part wire-cloth, with the meshes so small that bees cannot pass through it, but large enough to allow the small particles falling from the bees to fall through the cloth into the moth-drawer, as shown at E in Fig. 1. This brood-box rests on two pieces, like that shown at O, Fig. 5, in both of which there are grooves, as shown at Fig. 5, letter 2, in which the movable bottom board and screen move when pushed into its place. It is held firmly up against the bottom of the brood-box by the wedge R, as shown in Fig. 5. The wire-cloth allows the smell of bees and honey to pass below, thus giving the moth-drawer the same smell of bees and honey as the brood-box, thus enticing the moth into the moth-drawer through the opening in the front of the hive, as shown at M in Fig. 3, which communicates directly with an opening of the same size in the moth-drawer. This moth entrance is covered with wire-cloth, the mesh of which is large enough to admit the passage of the bee-moth, but too small to allow the passage of honey-bees.

E is the moth-drawer, made in the form as shown in Fig. 4, on the bottom of which rest the convex metallic strips N, as shown at Fig. 6, under which the moth and worms hide where they may be caught and destroyed by lifting up the piece N, Fig. 6. The bottom of the moth-trap or miller-drawer is provided with a metallic bottom, which retards the hatching of the moth-eggs in spring and autumn when the weather is cool.

Fig. 2, letter J, is a piece of metal or wood fitting closely on top of the moth-drawer with its inner edges turned down to prevent the small worms from crawling up and over the sides of the moth-drawer and up through the wire-cloth, which they will sometimes do, (if they are not prevented by the piece J,) thus effecting an entrance into the brood-box, where they will speedily destroy the bees.

B is the door to the back part of the hive, the side where the bees pass in and out being called the "front."

F is the feeding-box for feeding weak swarms.

G is the board that fits over the feeding-box, thus forming part of the movable bottom to the brood-box.

H is the wire-cloth separating the moth-drawer and brood-box and forming part of the movable bottom to the brood-box.

I is the passage-way between the brood-box and feeder.

K is a strip containing a groove in which the piece containing the mortise L moves up and down, the other end of the piece containing the mortise L working in a groove cut in the projection of the side of the box or outside of the hive, but it is by no means essential that there should be a slide made as described to cover the mouth of the hive.

P is the edge of the movable bottom as it rests in the grooves.

S is the sticks for supporting the honey in the brood-box.

U is the slide that closes the connection I when it is wished to shut the bees out of the feeding-box.

T is the frame to the movable bottom to the brood-box.

Having described the construction of my bee-hive, I will proceed to describe its operation.

Having put the bees into the hive, the bees will work out and in at the entrance L, which will be several inches from the entrance M. By contracting the bees' entrance suited to the season and the strength of the swarm, the bees will be enabled to protect themselves against the moth, and the moth, being thus baffled, will pass in at the entrance M into the moth-trap, where they will find the same smell of bees and honey that there is in the brood-box. They will also find the fine dust from the bees and fine particles of comb that have fallen through the wire-cloth, and they will also find a convenient place under the strips N, Fig. 6, to deposit their eggs, where they will hatch and may then be destroyed.

In feeding the bees all that is necessary is to prepare their food and pour it into the feeding-box F, when the slide U being withdrawn, the bees will pass down through the opening I and eat the feed placed there for them.

When it is wished to transport swarms to any considerable distance, the entrance for the bees may be closed by the sliding screen L, leaving the entrance M open to admit plenty of air to the bees.

Having described the nature, construction, and operation of my invention, what I claim therein as new and useful, and desire to secure by Letters Patent, is—

1. The convex pieces N, in combination with the moth-entrance M, movable bottom board, H and G, moth-drawer E, and protector J, when arranged together in the manner and for the purposes set forth.

2. The feed box F, entrance I, and slide U, in combination with groove Q, wedge R, cleat O, movable bottom H and G, when arranged, combined, and operated as herein set forth.

HARRISON OGBORN.

Witnesses:
G. W. STIGLEMAN,
JOHN W. FREE.